(12) United States Patent
Harding et al.

(10) Patent No.: US 7,327,473 B2
(45) Date of Patent: Feb. 5, 2008

(54) FLATNESS TESTER FOR OPTICAL COMPONENTS

(75) Inventors: Kevin George Harding, Niskayuna, NY (US); Shu-Guo Tang, Blue Bell, PA (US)

(73) Assignee: General Electric Company, Schenectady, NY (US)

( * ) Notice: Subject to any disclaimer, the term of this patent is extended or adjusted under 35 U.S.C. 154(b) by 220 days.

(21) Appl. No.: 11/286,029

(22) Filed: Nov. 23, 2005

(65) Prior Publication Data

US 2007/0115482 A1   May 24, 2007

(51) Int. Cl.
*G01B 11/30* (2006.01)
(52) U.S. Cl. ........................ 356/600; 356/613
(58) Field of Classification Search ........ 356/600–623, 356/445–448; 250/237 G, 231.16
See application file for complete search history.

(56) References Cited

U.S. PATENT DOCUMENTS

| | | | | |
|---|---|---|---|---|
| 2,867,149 A | * | 1/1959 | Goddard | 356/605 |
| 3,314,328 A | * | 4/1967 | Boettcher | 356/605 |
| 4,025,197 A | * | 5/1977 | Thompson | 356/499 |
| 4,771,549 A | * | 9/1988 | Shelangoskie et al. | 33/533 |
| 5,311,286 A | | 5/1994 | Pike | |
| 5,367,378 A | * | 11/1994 | Harding et al. | 356/613 |
| 5,471,307 A | * | 11/1995 | Koliopoulos et al. | 356/613 |
| 6,639,685 B1 | | 10/2003 | Gu et al. | |
| 2007/0115482 A1 | | 5/2007 | Harding et al. | |

OTHER PUBLICATIONS

International Search Report dated Apr. 1, 2007 for application number PCT/US2007/000125 (All references cited in International Search Report are listed above).

* cited by examiner

*Primary Examiner*—Hoa Q. Pham
(74) *Attorney, Agent, or Firm*—Cantor Colburn LLP

(57) ABSTRACT

Disclosed herein is a method comprising capturing an image of a grating formed on a surface of a brightness enhancing display film; measuring a displacement $\Delta d$ of a fringe from the image of the grating; and determining a slope of a deviation from flatness of the brightness enhancing display film from the displacement $\Delta d$ by using the equation (I)

$$\Delta d(y, \theta_2) = 2y\sin(\theta_1 + \theta_3 - 2\theta_2) \left[ \frac{\tan(\theta_1 + \theta_3 - \theta_2 - 90)}{\tan(90 - \theta_2) + \tan(\theta_1 + \theta_3 - \theta_2 - 90)} \right] \quad (I)$$

wherein y represents a distance along the brightness enhancing display film that represents a location of the deviation from flatness; $\theta_1$ is a light box angle; $\theta_2$ is the slope of the deviation from flatness in the brightness enhancing display film; and $\theta_3$ is a camera angle.

16 Claims, 8 Drawing Sheets

FLATNESS TESTER FOR OPTICAL COMPONENTS

BACKGROUND

This disclosure is related to a flatness tester for optical components. In particular, this disclosure is related to determining deviations from flatness of brightness enhancing display films that are used in display devices such as television screens or computer screens.

Brightness enhancing display films generally termed "prism sheets" are used in liquid crystalline display devices in order to collimate the light passing through a liquid crystal display. The brightness enhancing display film generally comprises a series of prisms disposed upon a film substrate. FIG. 1 is an exemplary depiction of the series of prisms disposed upon a film substrate. Each brightness enhancing display film comprises a prism surface and a back surface. The prism surface of the brightness enhancing display film is the surface that comprises the upper surfaces (the air contacting surfaces) of the prisms. The back surface of the brightness enhancing display film is the surface opposed to the prism surface. The back surface is generally flat and is parallel to the base of the prisms that are disposed upon the film substrate as shown in the FIG. 1.

Brightness enhancing display films are manufactured by pressing a malleable material against a prism-shaped mold. The malleable material is disposed upon an optically transparent film substrate. Possible manufacturing processes include melt calendaring, embossing, injection molding, compression molding, casting and curing of thermally cured resin onto a substrate, and casting and curing of UV cured resin onto the film substrate.

It is desirable for the brightness enhancing display film to collimate most of the light incident upon the back surface of the film substrate in the on-axis direction. As can be seen in the FIG. 1, the on-axis brightness is the brightness measured in a direction perpendicular to the back surface of the brightness enhancing display film.

During the manufacturing, storage or transportation of a brightness enhancing display film it is possible for the prism surface or the back surface of the film substrate to become distorted or curved. This distortion or curvature is generally undesirable. If the surfaces of the brightness enhancing display film are curved, the brightness in the on-axis direction can be decreased. In addition, variations in flatness introduced from processing errors to roll imperfections (the brightness enhancing display films are stored in rolls) cause interference rings when viewed in transmission. It is therefore desirable to have a method that can be used to determine the amount of deviation from flatness in the surfaces of the brightness enhancing display film.

SUMMARY

Disclosed herein is a method comprising capturing an image of a grating formed on a surface of a brightness enhancing display film; measuring a displacement $\Delta d$ of a fringe from the image of the grating; and determining a slope of a deviation from flatness of the brightness enhancing display film from the displacement $\Delta d$ by using the equation (I)

$$\Delta d(y, \theta_2) = 2y\sin(\theta_1 + \theta_3 - 2\theta_2)\left[\frac{\tan(\theta_1 + \theta_3 - \theta_2 - 90)}{\tan(90 - \theta_2) + \tan(\theta_1 + \theta_3 - \theta_2 - 90)}\right] \quad (I)$$

wherein y represents a distance along the brightness enhancing display film that represents a location of the deviation from flatness; $\theta_1$ is a light box angle; $\theta_2$ is the slope of the deviation from flatness in the brightness enhancing display film; and $\theta_3$ is a camera angle.

Disclosed herein is an apparatus comprising a light box; a grating disposed thereon; a platform for holding a brightness enhancing display film; and a camera for recording an image of the grating on the brightness enhancing display film; wherein the image can be used to measure a displacement $\Delta d$ of a fringe from the image of the grating and determine a slope of a deviation from flatness of the brightness enhancing display film from the displacement $\Delta d$ by using the equation (I)

$$\Delta d(y, \theta_2) = 2y\sin(\theta_1 + \theta_3 - 2\theta_2)\left[\frac{\tan(\theta_1 + \theta_3 - \theta_2 - 90)}{\tan(90 - \theta_2) + \tan(\theta_1 + \theta_3 - \theta_2 - 90)}\right] \quad (I)$$

wherein y represents a distance along the brightness enhancing display film that represents a location of the deviation from flatness; $\theta_1$ is a light box angle; $\theta_2$ is the slope of the deviation from flatness in the brightness enhancing display film; and $\theta_3$ is a camera angle.

DETAILED DESCRIPTION OF FIGURES

Figure 3:
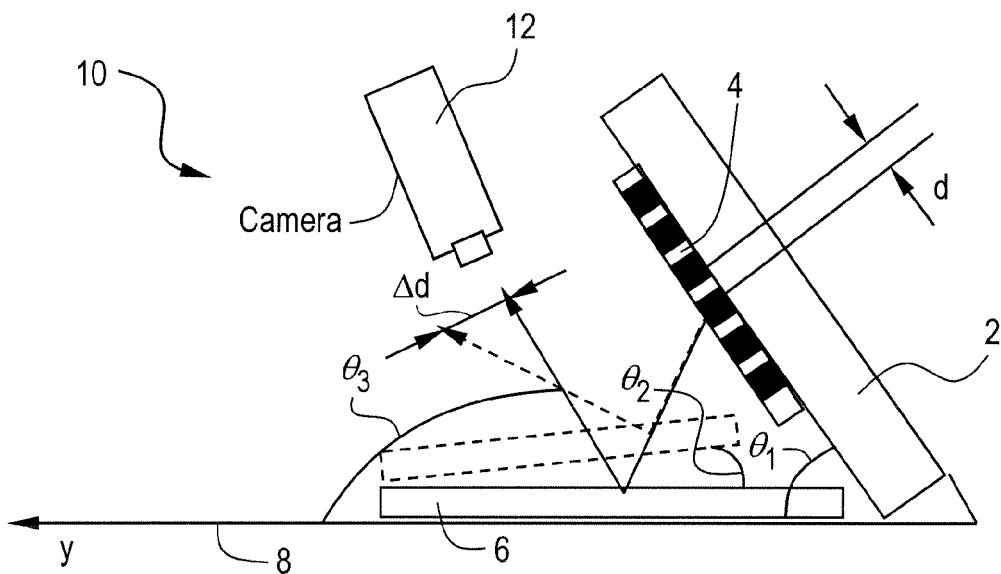
Figure 4:
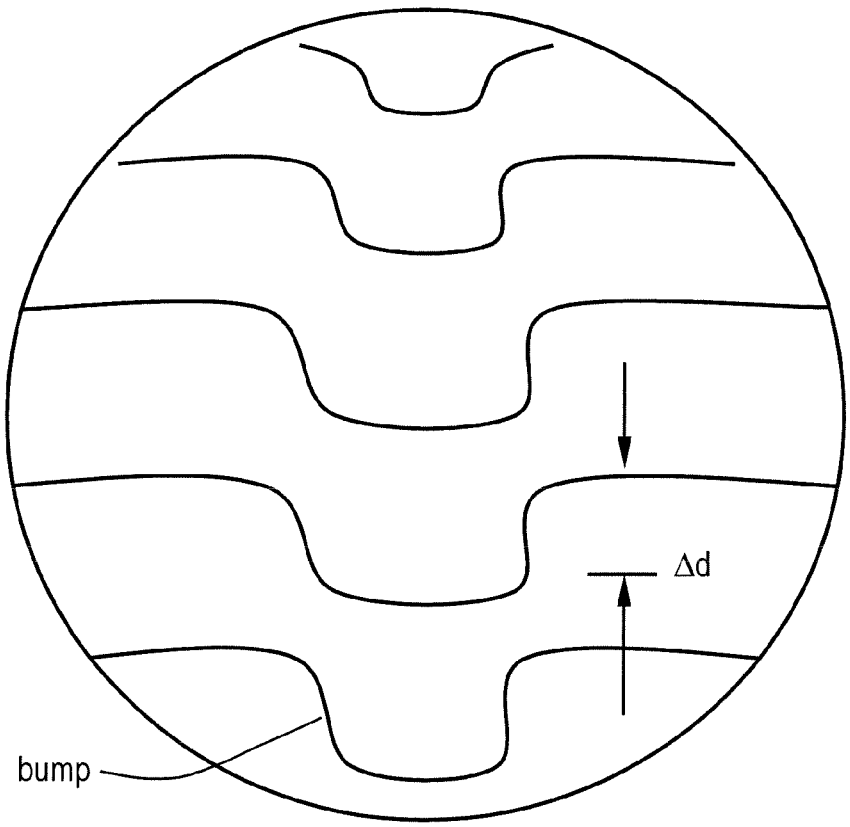
Figure 5:
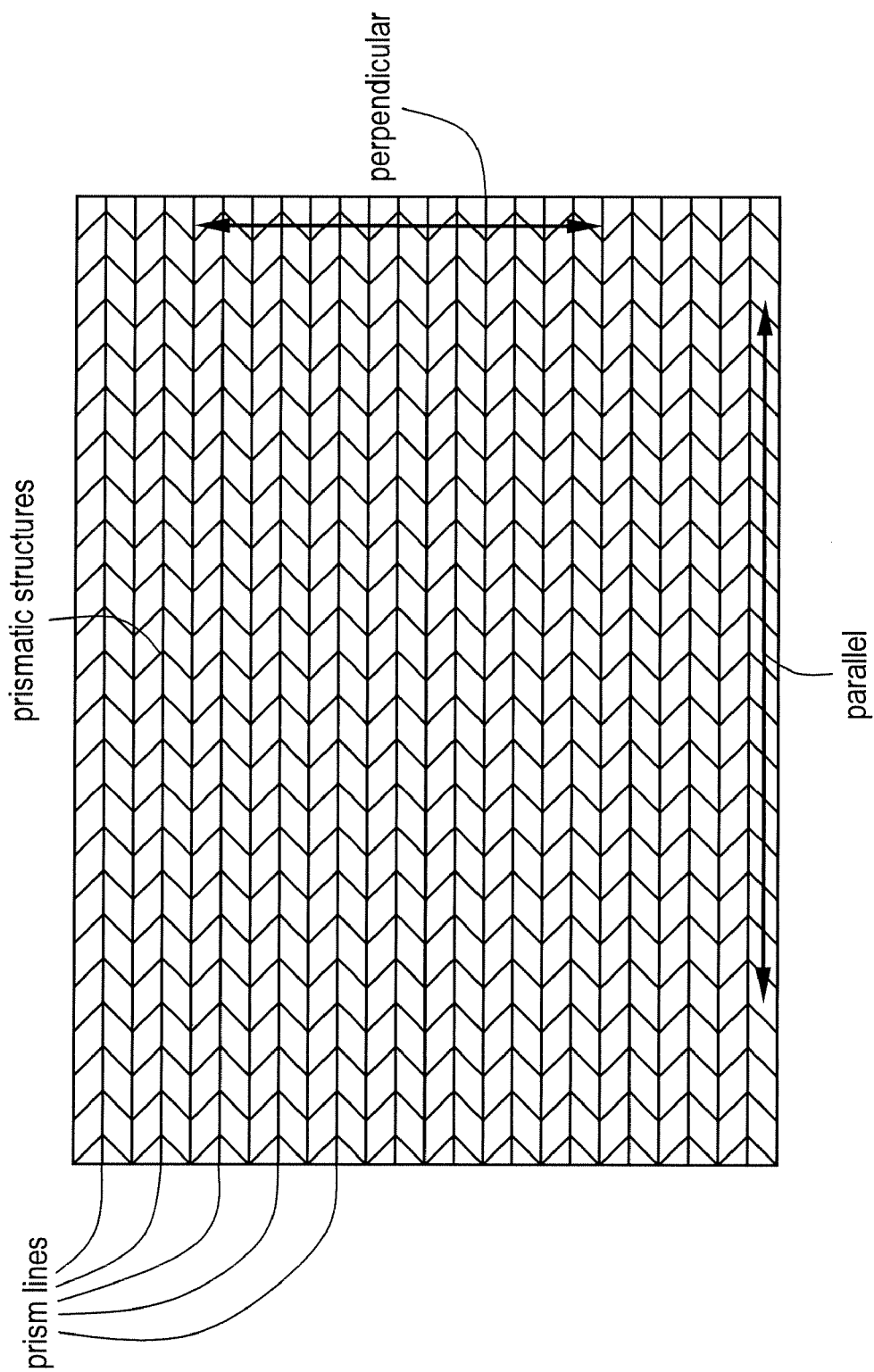
Figure 6:
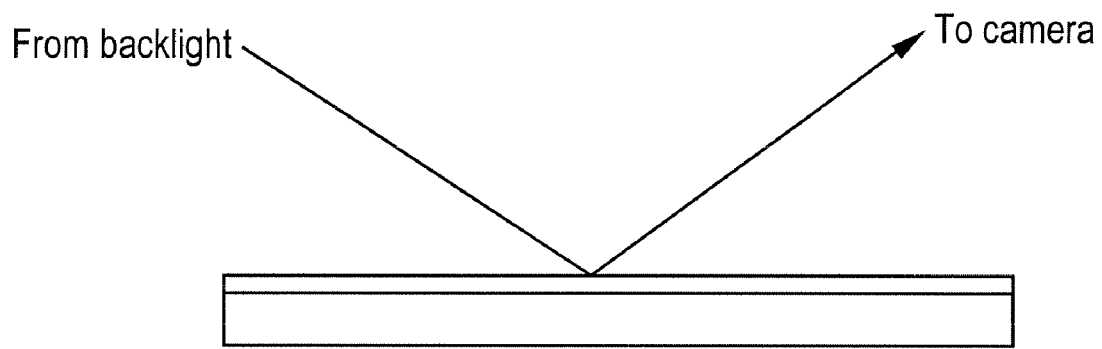
Figure 7:
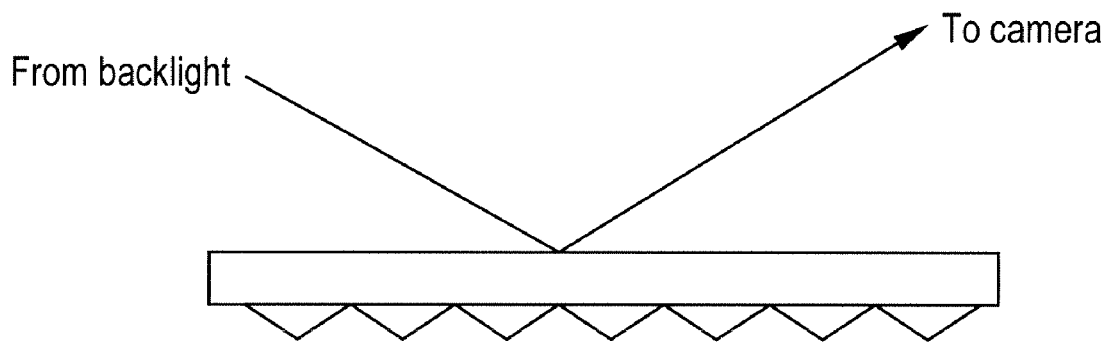
Figure 8:
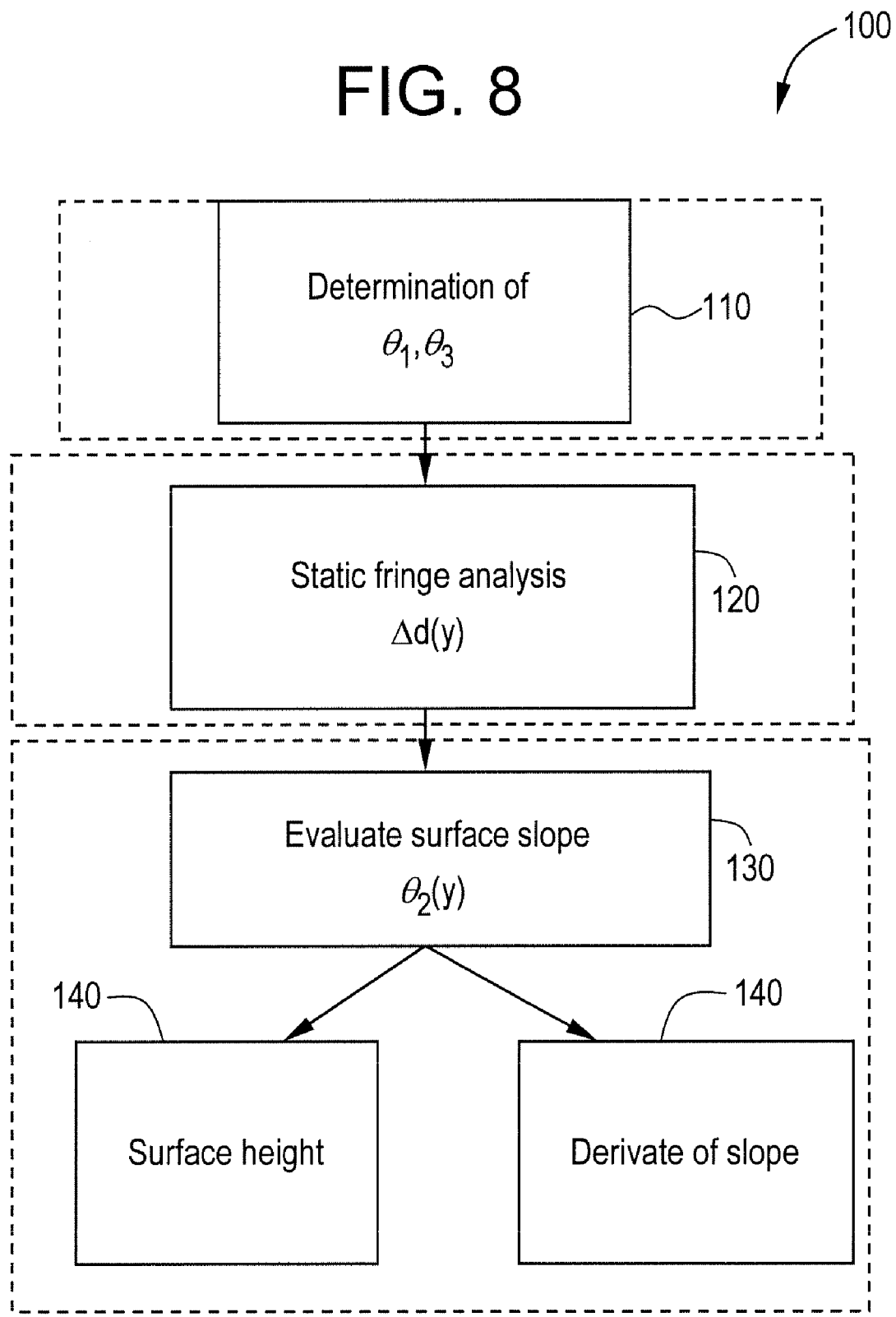
Figure 9:
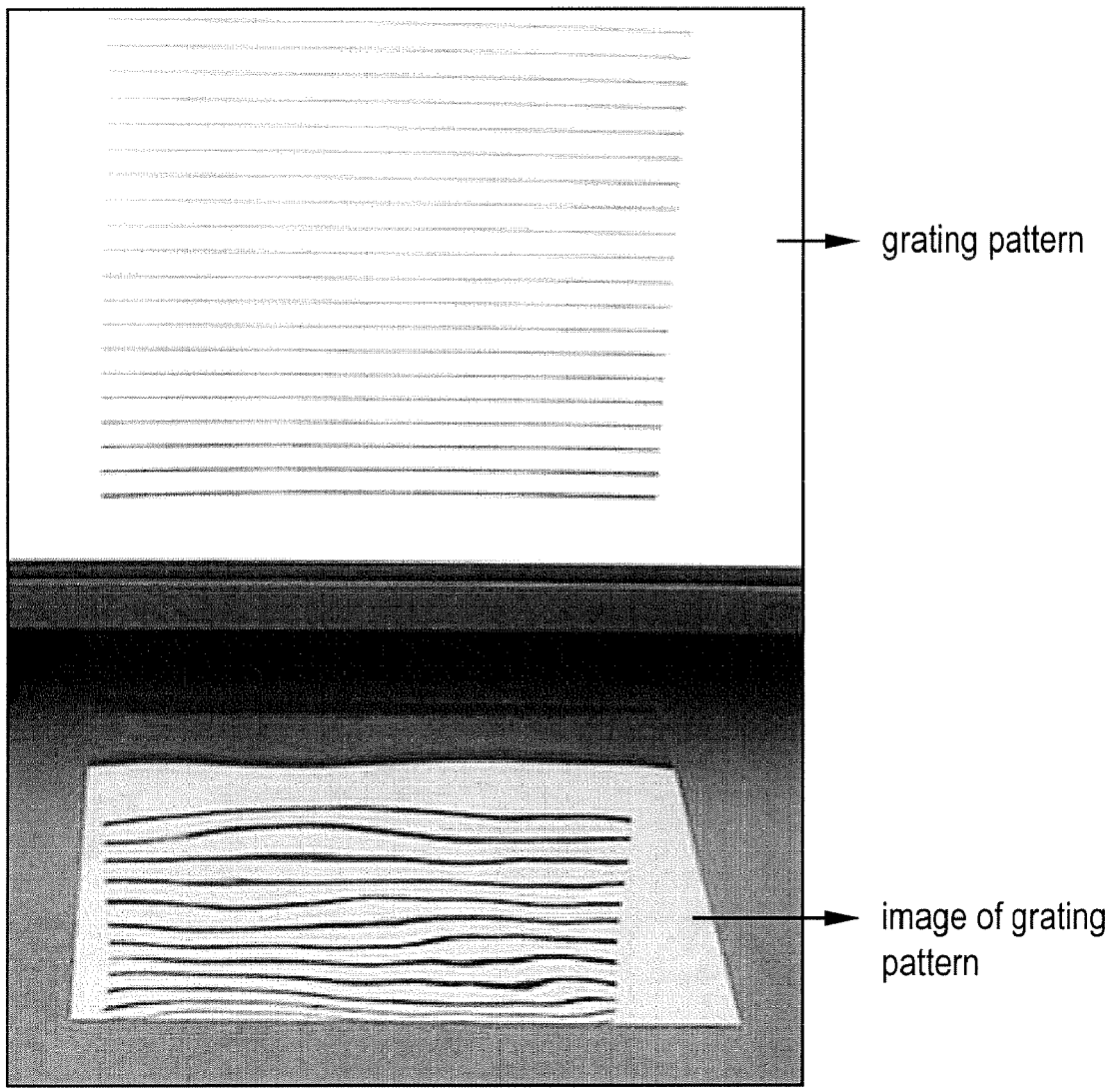
Figure 10:
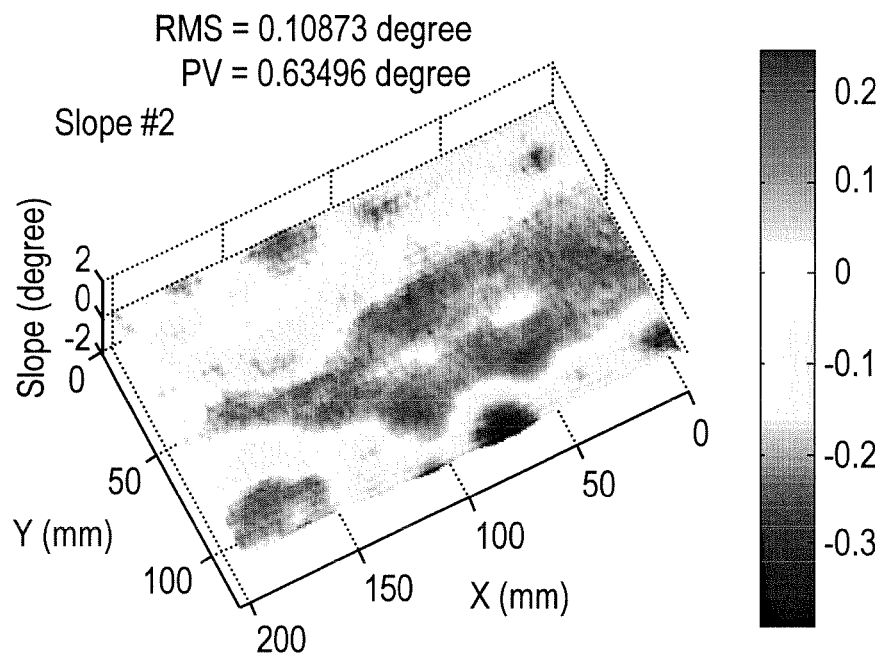
Figure 11:
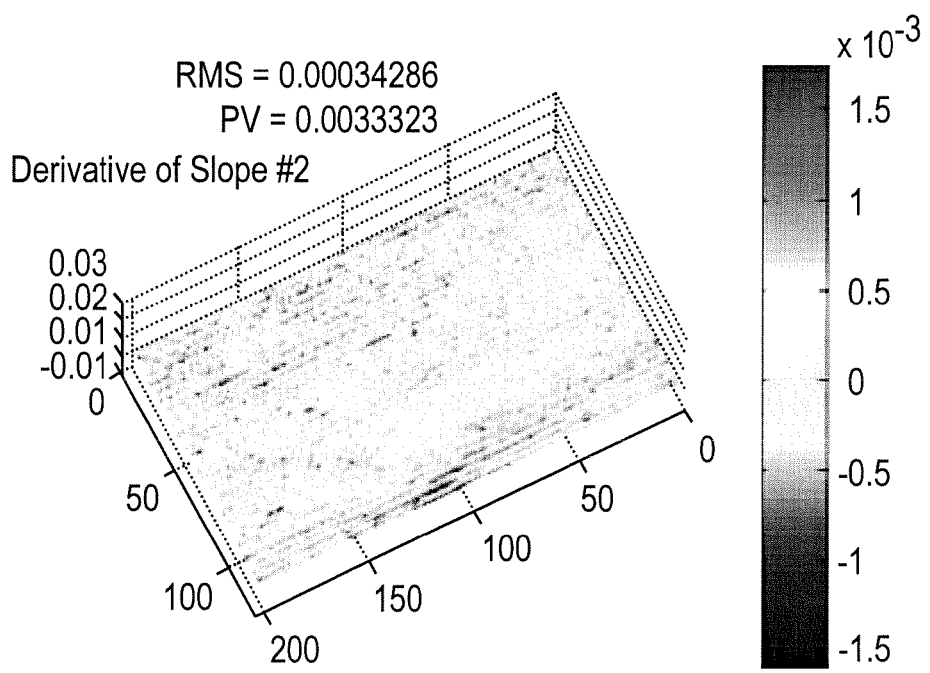
Figure 12:
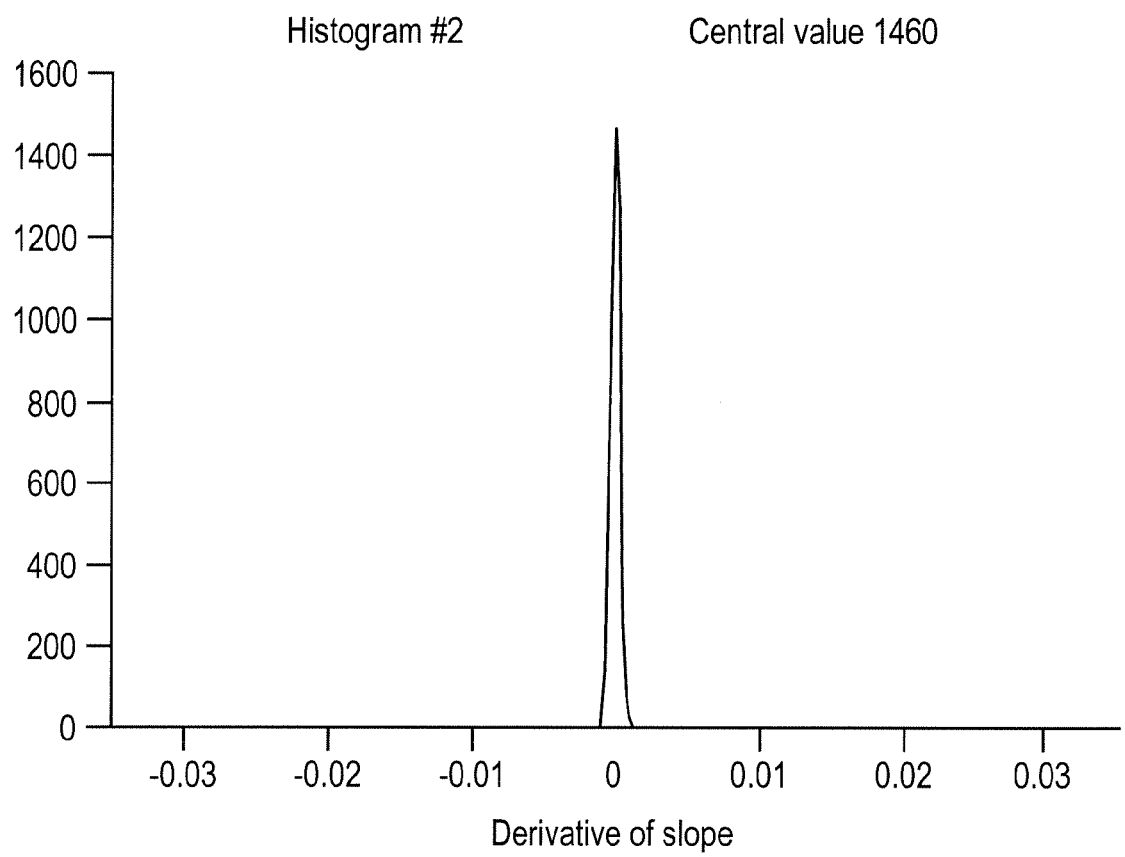

FIG. 3 is an exemplary depiction of the apparatus 10 for measuring the slope of deviation from flatness of a brightness enhancing display film; the apparatus comprises a light box 2 upon which is disposed a coarse grating 4; a platform 8 upon which the brightness enhancing display film is disposed and an imaging device 12;

FIG. 4 reflects the displacement $\Delta d$ of the coarse grating image. As can be seen from the FIG. 4, the image of the grating comprises a series of bands that correspond to the alternating series of opaque and transparent lines on the coarse grating; the bump in the image corresponds to the deviation from flatness;

FIG. 5 shows an exemplary brightness enhancing display film with the parallel and perpendicular directions to the prism lines indicated thereon;

FIG. 6 shows the direction of the illuminating beam from the coarse grating incident upon the prism surface in a direction that is parallel to the prism lines;

FIG. 7 shows the direction of the illuminating beam from the coarse grating incident upon the back surface in a direction that is perpendicular to the prism lines;

FIG. 8 is an exemplary depiction of a process schematic that can facilitate a determination of the slope of the deviation from flatness, the height of the slope and the rate of deviation from flatness for a brightness enhancing display film;

FIG. 9 comprises an upper portion and a lower portion; the upper portion shows the actual grating pattern while the lower portion reflects the image of the grating pattern due to reflection from the brightness enhancing display film;

FIG. 10 is a slope map showing local variations in the center of the film ranging from −0.3 to +0.2 degrees;

FIG. 11 is generated by taking a derivative of the slope map shown in FIG. 10. FIG. 11 shows the derivative of slope ranging from −0.0015 to +0.0015 degrees per millimeter; and FIG. 12 is a depiction of the central value of the derivative of the slope which overall measure of the quality of the film.

DETAILED DESCRIPTION

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). It is to be noted that all ranges disclosed within this specification are inclusive and independently combinable.

Disclosed herein are an apparatus and a method for determining deviations from flatness in the surfaces of a brightness enhancing display film. The method can be advantageously used to determine the height of the deviation as well as the rate of the deviation from flatness. The rate of the deviation from flatness can be used as a measure of film quality. The method comprises capturing an image of a coarse grating target formed on the brightness enhancing display film and analyzing the displacement in the fringe image of the grating to arrive at the height, the slope and the rate of change of the slope of a deviation from flatness.

When the brightness enhancing display film contains a portion that deviates from being flat, such as, for example, a curved portion or an undulation, there occurs a displacement in the fringe image of the grating. The change of slope in the brightness enhancing display film at the curved portion can be quantified by measuring the displacement in the fringe image of the grating. A mathematical equation relates the displacement in the fringe image to the slope of the curved surface of the brightness enhancing display film. The static fringe analysis and the corresponding mathematical equations can be used to quantify the displacement of the fringe image and to convert this displacement into a determinable value for the slope of the curved portion, the height of the curved portion and the rate of change in the slope of the curved portion.

Figure 1:
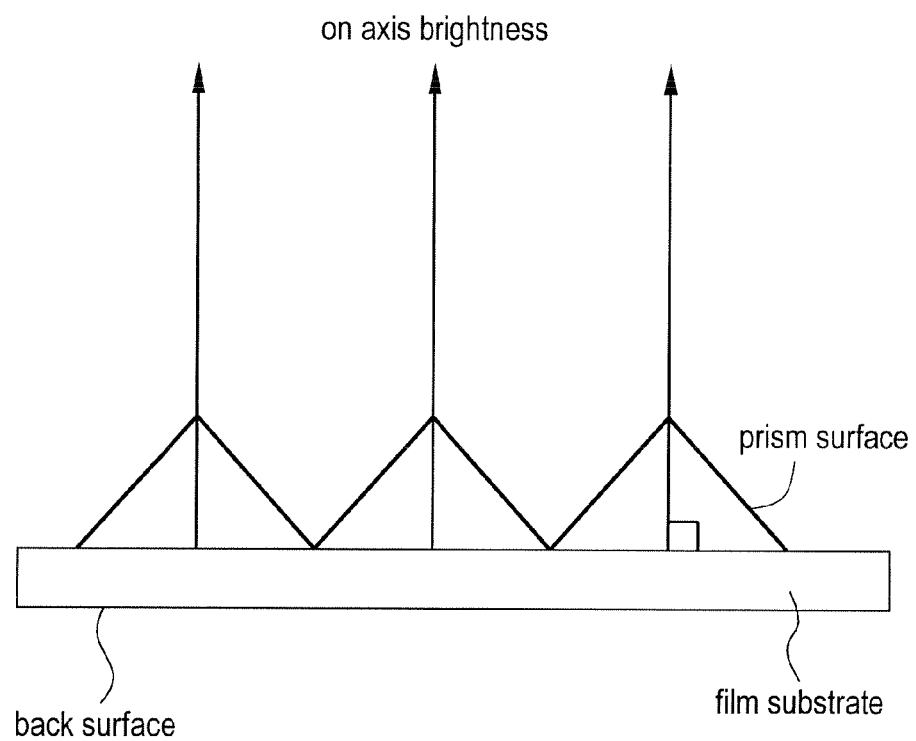
FIG. 1 is a depiction showing the back surface and the prism surface of a brightness enhancing display film.
Figure 2:
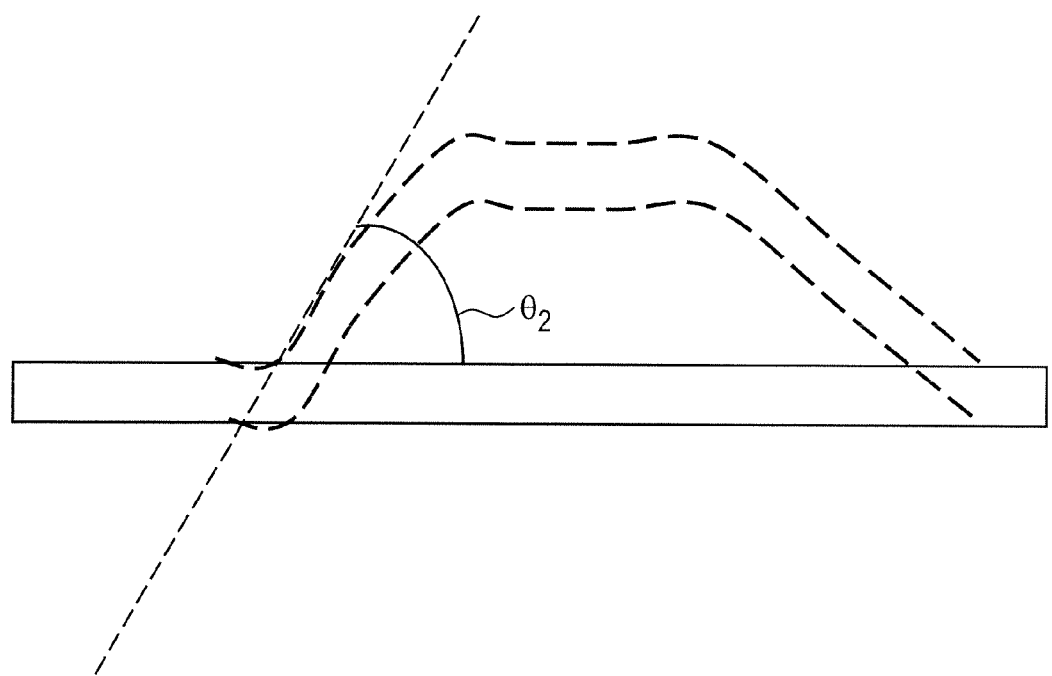
FIG. 2 is an exemplary depiction demonstrating how $\theta_2$ the angle of the slope is measured; the angle of the slope is the tangent to the surface slope is taken at the point of departure of the surface slope from the horizontal.

An exemplary depiction of the surface slope of the curved surface is shown in the FIG. 2. An angle $\theta_2$ is used to measure the value of the slope. The angle $\theta_2$ is the angle between a tangent to the surface slope and a theoretically flat surface. For example, as can be seen in the FIG. 2, when the brightness enhancing display film is placed on a horizontal surface, the tangent to the surface slope is taken at the point of departure of the surface slope from the horizontal.

As noted above, a brightness enhancing film comprises two surfaces, a prism surface and a back surface that are opposed to each other. The method disclosed herein can be advantageously used to determine the slope of a deviation from flatness on either the prism surface or the back surface.

With reference now to the FIG. 3, an apparatus 10 for measuring the surface slope of a brightness enhancing display film comprises a light box 2 upon which is disposed a coarse grating 4. In one embodiment, the light box 2 can be a backlight assembly from a display device. The coarse grating 4 is a Ronchi grating and comprises an alternating series of opaque and transparent lines each having a width of about 0.5 inch (about 1.25 centimeters). The opaque lines are generally black in color. The light emitted by the light box 2 is incident upon the surface of the brightness enhancing display film 6 that is disposed upon a platform 8. In an exemplary embodiment, the platform 8 is in a horizontal position. An imaging device 12 captures the image of the grating formed on the surface of the brightness enhancing display film. The imaging device 12 is generally a camera. In an exemplary embodiment, the imaging device 12 is a camera that is in electrical communication with a computer. Images captured by the camera can be transferred to the computer and stored for further analysis.

As can be seen from the FIG. 3, the surface of the light box 2 is inclined at an angle $\theta_1$ to the surface of the platform 8 upon which the brightness enhancing display film is mounted. $\theta_1$ will hereinafter be referred to as the light box angle.

The light reflected from the surface of the brightness enhancing display film is imaged by a camera 12 and is inclined at an angle $\theta_3$ to the platform surface. In other words, if the surface of the brightness enhancing display film is not curved, the angle between the surface of the brightness enhancing display film and the reflected beam of light that is imaged by the camera would be $\theta_3$. $\theta_3$ will hereinafter referred to as the camera angle. As can be seen from the FIG. 3, when the surface of the brightness enhancing display film is curved, the reflected beam is deflected by an amount of $\Delta d$. The angle between a tangent to the portion of the film that deviates from flatness, taken at the origin of curvature and the platform surface is shown as $\theta_2$. $\theta_2$ is the slope of the deviation from flatness in the surface of the brightness enhancing display film.

FIG. 4 reflects the displacement $\Delta d$ of the coarse grating image. As can be seen from the FIG. 4, the image of the grating comprises a series of bands that correspond to the alternating series of opaque and transparent lines on the coarse grating. Each image of the lines contains a "bump" that corresponds to the deviation from flatness. The largest bump in the image is used to determine the displacement $\Delta d$. The value of $\Delta d$ provides a measure of the height of the deviation from flatness. In one embodiment, the rate of change of $\Delta d$ as measured from the image, can be used to determine the rate of change of the deviation from flatness. The rate of change of the deviation from flatness can also be determined by taking the derivate of the slope of a plot of $\Delta d$ versus $\theta_2$ as will be explained in detail below.

The slope of a deviation from flatness can be determined on the prism surface or on the back surface by illuminating the respective surface and measuring the displacement of the grating image. In examining the brightness enhancing display film for deviations from flatness, it may be oriented at any angle to the incident illuminating beam. In other words, the prism lines can be oriented in any direction with respect to the incident illuminating beam. In one exemplary embodiment, when testing the prism surface for deviations from flatness, the prism lines are positioned so as to be parallel to the beam of illuminating light. In another exemplary embodiment, when testing the back surface, the prism lines are positioned so as to be perpendicular to the beam of illuminating light. FIG. 5 shows an exemplary brightness enhancing display film with the parallel and perpendicular directions to the prism lines indicated thereon. FIGS. 6 and 7 depict the testing of the prism surface and the back surface respectively for deviations from flatness. FIG. 6 shows the direction of the illuminating beam from the coarse grating incident upon the prism surface in a direction that is parallel to the prism lines. FIG. 7 shows the direction of the illuminating beam from the coarse grating incident upon the back surface in a direction that is perpendicular to the prism lines. It is generally desirable to test brightness enhancing films that are used in the horizontal configuration (in a liquid crystalline display) on the back surface and brightness enhancing films that are used in the vertical configuration on the prism surface.

With reference now again to the FIG. 4, when, the surface of the brightness enhancing display film is curved, the displacement Δd of the coarse grating image can be related to the slope of the curved surface of the brightness enhancing display film by the equation (1)

$$\Delta d(y, \theta_2) = 2y\sin(\theta_1 + \theta_3 - 2\theta_2)\left[\frac{\tan(\theta_1 + \theta_3 - \theta_2 - 90)}{\tan(90 - \theta_2) + \tan(\theta_1 + \theta_3 - \theta_2 - 90)}\right] \quad (1)$$

where y represents a distance along the film that represents the location of a deviation from flatness.

By plotting the displacement "Δd" versus the slope "$\theta_2$", the direction of the slope can be determined. In other words, the direction of displacement in the fringe image of the grating can be used to determine the sign of the slope, which can be used as a measure of the direction of the deviation from flatness.

In one embodiment, the equation (I) can be optimized for a given setting. In other words, the angular position of the light box as measured by the light box angle $\theta_1$ and the angular position of the camera as measured by the camera angle $\theta_3$, can be adjusted and optimized in order to effectively and efficiently determine the slope of the surface of the brightness enhancing display film.

In order to determine the slope of the surface of the brightness enhancing display film, the area of the surface to be measured can play a role in determining the value of the light box angle $\theta_1$ as well as the camera angle $\theta_3$. The relationship between the area of the surface that is measured and the light box angle $\theta_1$ as well as the camera angle $\theta_3$ is given by the equation (II) below:

$$\text{Area}_{meas} = \text{Area}_{film} \times \cos(\theta_1 + \theta_3 - 90) \quad (II)$$

where $\text{Area}_{meas}$ is the area measured for deviations from flatness and $\text{Area}_{film}$ is the total area of the film.

In general, in order to determine the slope of a deviation from flatness by measuring the grating displacement, the size of the measurement area is optimized against sum of the light box angle $\theta_1$ and the camera angle $\theta_3$.

From the equation (II), it can be seen that any desirable area of the brightness enhancing display film can be measured in order to determine the deviation from flatness. In one embodiment, a plurality of deviations from flatness can be measured and imaged on a single brightness enhancing display film during a single illumination of the film.

In an exemplary embodiment, an area of greater than or equal to about 10 cm² can be examined for a deviation from flatness in a single illumination of the brightness enhancing display film. In another exemplary embodiment, an area of greater than or equal to about 50 cm² can be examined for a deviation from flatness in a single illumination of the brightness enhancing display film. In yet another exemplary embodiment, an area of greater than or equal to about 100 cm² can be examined for a deviation from flatness in a single illumination of the brightness enhancing display film. In yet another exemplary embodiment, an area of greater than or equal to about 1,000 cm² can be examined for a deviation from flatness in a single illumination of the brightness enhancing display film. In yet another exemplary embodiment, an area of greater than or equal to about 10,000 cm² can be examined for a deviation from flatness in a single illumination of the brightness enhancing display film.

The coarse grating can also be changed during the measurement of a single brightness enhancing display film to obtain a desirable resolution of the displacement image from which the slope of the deviation from flatness or the height of the deviation can be measured. For example, a coarse grating having a series of opaque and transparent lines each having a thickness of greater than or equal to about 0.25 centimeter can be used. In another embodiment, a coarse grating having a series of opaque and transparent lines each having a thickness of greater than or equal to about 0.50 centimeter can be used. In yet another embodiment, a coarse grating having a series of opaque and transparent lines each having a thickness of greater than or equal to about 0.75 centimeter can be used. In yet another embodiment, a coarse grating having a series of opaque and transparent lines each having a thickness of greater than or equal to about 1.25 centimeter can be used. The lines on the grating can be uniformly spaced or non-uniformly spaced if desired. The thickness of the lines can also be varied.

In general, it is desirable to use a grating having thinner lines (e.g., less than or equal to about 0.50 centimeters) when the rate of deviation from flatness is greater than or equal to about 0.0004 degrees per millimeter. Since a rapid deviation from flatness generally causes the lines in the grating image to be closer to one another, it is desirable to use a grating having thinner lines, as this facilitates ease of measurement of the displacement in the image of the grating.

In one embodiment, in order to effectively determine the slope of the deviation from flatness of the brightness enhancing display film, while measuring the maximum area possible, it is desirable to have a light box angle $\theta_1$ of about 40 to about 70 degrees, when measured from the platform surface. In another embodiment, it is desirable to have the light box angle be about 45 to about 60 degrees, when measured from the platform surface. In yet another embodiment, it is desirable to have the light box angle be about 48 to about 55 degrees, when measured from the platform surface. An exemplary light box angle is about 52 degrees.

In order to effectively determine the slope of the deviation from flatness of the brightness enhancing display film, while measuring the maximum area possible, it is also desirable to have a camera angle $\theta_3$ of about 50 to about 80 degrees, when measured from the platform surface. In one embodiment, it is desirable to have the camera angle be about 55 to about 75 degrees, when measured from the platform surface. In another embodiment, it is desirable to have the camera angle be about 60 to about 70 degrees, when measured from the platform surface. In yet another embodiment, it is desirable to have the camera angle be about 62 to about 68 degrees, when measured from the platform surface. An exemplary camera angle is about 64 degrees.

The sum of the light box angle and the camera angle can be less than or equal to about 90 degrees. In another embodiment, it is desirable to have the sum of the light box angle and the camera angle to be about 91 degrees to about 180 degrees. In yet another embodiment, it is desirable to have the sum of the light box angle and the camera angle to be about 95 degrees to about 150 degrees. In yet another embodiment, it is desirable to have the sum of the light box angle and the camera angle to be about 100 degrees to about 130 degrees. In yet another embodiment, it is desirable to have the sum of the light box angle and the camera angle to be about 110 degrees to about 120 degrees. An exemplary value of the sum of the light box angle and the camera angle is about 116 degrees.

When exemplary values of the light box angle and the camera angle are substituted into the equation (I), the equation can be simplified to the equation (III) that can also be used to determine the slope of the surface of the brightness enhancing display film.

$$\Delta d = 0.0153 y \theta_2 \qquad (III)$$

where y has the same meaning as in equation (I) above.

As noted above, the displacement "$\Delta d$" can be graphically plotted versus the slope "$\theta_2$". The direction of the slope can be determined from the graphical plot. The total amount of deviation from flatness (i.e., the height of the deviation) can also be estimated from the largest value of "$\Delta d$" that is measured from the displacement image. In addition, a derivative of the slope can be used to determine the rate of deviation from flatness. The rate of the deviation from flatness is also termed the quality of the slope. In general, it is desirable to use films that have a rate of deviation from flatness that is less than or equal to about 0.0004 degrees per millimeter.

The aforementioned method for determining the slope of a deviation from flatness, the maximum height of the deviation and the rate of deviation from flatness can be automated and computer controlled if desired. In one embodiment, the brightness enhancing display films can be disposed upon a conveyor belt and can be subjected to automated measurements and automated analysis using a controlling device. An exemplary controlling device is a computer.

An exemplary process that can be computer controlled is shown in the FIG. 8. As seen in the FIG. 8, the computer can execute an algorithm 100 that facilitates the optional determination in step 110 of the light box angle $\theta_1$ and the camera angle $\theta_3$ for each brightness enhancing display film. The algorithm then facilitates the generation of an image of the grating followed by a static fringe analysis in step 120. In step 130, the algorithm facilitates a determination of the slope of the deviation from flatness. In step 140, the maximum height and the derivative of the slope are determined from the slope of the deviation from flatness obtained in step 130. The algorithm may also optionally use the information obtained in steps 130 and 140 to generate an map of the deviations from flatness that can be stored for future reference.

The aforementioned method for determining the slope of the deviations from flatness, the maximum height of the deviation and the rate of deviation from flatness can be used to determine patterns in the deviation. If it is noticed that there is a repeated pattern to such deviations from flatness, then an attempt may be made to trace back the deviations from flatness to the source of the deviations. The source of the deviations can then be rectified or eliminated.

The aforementioned method for determining the deviations from flatness is also advantageous in that the deviations can be quantified. This permits the use of a quality control standard to effectively eliminate deviations that have a rate of deviation of flatness that is greater than or equal to about 0.0004 degrees per minute.

The following examples, which are meant to be exemplary, not limiting, illustrate the apparatus and the method of determining the deviations from flatness described herein.

EXAMPLE

Example 1

A brightness enhancing display film comprising acrylate prisms disposed upon a polycarbonate film substrate was placed on a platform surface. The brightness enhancing display film was placed upon the platform surface such that light from a light box was incident upon the back surface of the brightness enhancing display film. The apparatus is set-up in a manner similar to that depicted in the FIG. 3 above.

The light box is approximately 12 inches wide and was tilted forward over the test film at an angle of 45 degrees. In other words, the light box angle $\theta_1$ was 45 degrees. Disposed upon the light box, was a Ronchi grating having a series of opaque and transparent lines each having a thickness of 0.5 inches. The grating image is captured by a video camera. The height of the brightness enhancing display film in this example is about 8 inches. In other words, y is 8 inches.

The video camera is a Sony XS55 camera having a resolution of 640×480 pixels. The camera collects the displacement image from the test film and is located on the opposite side of brightness enhancing display film from the light box. The video camera is located such that its longitudinal axis coincides with a beam of light reflected from the brightness enhancing display film that is inclined at a 45 degree angle to the platform surface upon which the film is mounted. In other words, the camera angle $\theta_3$ is 45 degrees.

The upper portion of FIG. 9 reflects the actual grating pattern while the lower portion reflects the image of the grating pattern due to reflection from the brightness enhancing display film. From the image it can be seen that the lines of the grating are curved due to the deviations from flatness of the brightness enhancing display film. The image of the grating pattern depicted in the lower portion of the FIG. 9 is used to derive the slope of the brightness enhancing display film as well as the slope map shown in the FIG. 10. This slope map in the FIG. 10 shows local variations in the center of the film ranging from −0.3 to +0.2 degrees, the scale on the graph being in degrees. The derivative map depicted in FIG. 11 is generated by taking a derivative of the slope map shown in FIG. 10. FIG. 11 shows the derivative of slope ranging from −0.0015 to +0.0015 degrees per millimeter as indicated by the pseudo color scale on the graph. The central value of the derivative of the slope is shown in FIG. 12. This central value of the derivative of the slope provides the statistically predominant value of the derivative of the slope, whereby more than 80 percent of the surface is within this measured value. This central value of the derivative of the slope thereby provides a single, representative number that is a significant measure of an overall measure of the quality of the film. Central values of the derivative of the slope in excess of 0.0004 degrees per millimeter are easily visible to the human operator and are considered bad.

From the example, it may be seen that the aforementioned method can be advantageously used for determining the slope of the deviations from flatness. The rate of the deviation from flatness that is derived from the slope can be advantageously used as a quality control tool to reject samples that have an excessive rate of deviation from flatness.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method comprising:
   capturing an image of a grating formed on a surface of a brightness enhancing display film;
   measuring a displacement $\Delta d$ of a fringe from the image of the grating; and
   determining a slope of a deviation from flatness of the brightness enhancing display film from the displacement $\Delta d$ by using the equation (I)

$$\Delta d(y, \theta_2) = 2y\sin(\theta_1 + \theta_3 - 2\theta_2) \left[ \frac{\tan(\theta_1 + \theta_3 - \theta_2 - 90)}{\tan(90 - \theta_2) + \tan(\theta_1 + \theta_3 - \theta_2 - 90)} \right] \quad (I)$$

wherein y represents a distance along the brightness enhancing display film that represents a location of the deviation from flatness; $\theta_1$ is a light box angle; $\theta_2$ is the slope of the deviation from flatness in the brightness enhancing display film; and $\theta_3$ is a camera angle.

2. The method of claim 1, further comprising determining a rate of deviation from flatness by taking a derivative of the slope of the deviation from flatness.

3. The method of claim 2, further comprising rejecting a brightness enhancing display film when the rate of deviation from flatness exceeds 0.0004 degrees per minute.

4. The method of claim 1, wherein the sum of the light box angle $\theta_1$ and the camera angle $\theta_3$ is less than or equal to about 90 degrees.

5. The method of claim 1, wherein the sum of the light box angle $\theta_1$ and the camera angle $\theta_3$ is greater than 90 degrees.

6. The method of claim 1, wherein the sum of the light box angle $\theta_1$ and the camera angle $\theta_3$ is equal to about 116 degrees.

7. The method of claim 6, wherein the wherein the slope of the deviation from flatness of the brightness enhancing display film can be determined by using the equation (III)

$$\Delta d = 0.0153 y \theta_2 \quad (III)$$

wherein y represents a distance along the brightness enhancing display film that represents a location of the deviation from flatness.

8. The method of claim 7, further comprising graphically representing the relationship between $\Delta d$ and $\theta_2$ in order to obtain the slope of the deviation from flatness.

9. The method of claim 1, further comprising graphically representing the relationship between $\Delta d$ and $\theta_2$ in order to obtain the slope of the deviation from flatness.

10. The method of claim 1, wherein the surface of the brightness enhancing display film is a back surface.

11. The method of claim 10, wherein a beam of light transmitted through the grating is incident upon the brightness enhancing display film in a direction perpendicular to a prism line.

12. The method of claim 1, wherein the surface of the brightness enhancing display film is a prism surface.

13. The method of claim 12, wherein a beam of light transmitted through the grating is incident upon the brightness enhancing display film in a direction parallel to a prism line.

14. An apparatus that employs the method of claim 1.

15. An apparatus comprising:
    a light box;
    a grating disposed thereon;
    a platform for holding a brightness enhancing display film; and
    a camera for recording an image of the grating on the brightness enhancing display film; wherein the image can be used to measure a displacement $\Delta d$ of a fringe from the image of the grating and determine a slope of a deviation from flatness of the brightness enhancing display film from the displacement $\Delta d$ by using the equation (I)

$$\Delta d(y, \theta_2) = 2y\sin(\theta_1 + \theta_3 - 2\theta_2) \left[ \frac{\tan(\theta_1 + \theta_3 - \theta_2 - 90)}{\tan(90 - \theta_2) + \tan(\theta_1 + \theta_3 - \theta_2 - 90)} \right] \quad (I)$$

wherein y represents a distance along the brightness enhancing display film that represents a location of the deviation from flatness; $\theta_1$ is a light box angle; $\theta_2$ is the slope of the deviation from flatness in the brightness enhancing display film; and $\theta_3$ is a camera angle.

16. The apparatus of claim 15, further comprising a computer, wherein the computer executes an algorithm that is operative to facilitate the apparatus in:
    capturing an image of a grating formed on a surface of a brightness enhancing display film;
    measuring the displacement $\Delta d$ of the fringe from the image of the grating; and
    determining the slope of the deviation from flatness of the brightness enhancing display film.

* * * * *